United States Patent [19]

Leigh-Monstevens et al.

[11] Patent Number: 4,705,151

[45] Date of Patent: Nov. 10, 1987

[54] HYDRAULIC SLAVE CYLINDER INTERLOCK SWITCHING DEVICE WITH PROXIMITY SENSOR

[75] Inventors: Keith V. Leigh-Monstevens, Troy; Richard A. Nix, Rochester Hills; Claude A. Patalidis, deceased, late of Southfield, all of Mich., by Monique Patalidis, executrix

[73] Assignee: Automotive Product plc, Warwickshire, England

[21] Appl. No.: 793,710

[22] Filed: Oct. 31, 1985

[51] Int. Cl.$^4$ ............................................ F16D 13/75
[52] U.S. Cl. ........................... 192/111 A; 192/30 W; 192/70.25; 192/0.096
[58] Field of Search ............... 192/0.084, 0.096, 30 W, 192/70.25, 111 A, 111 R, 147

[56] References Cited

U.S. PATENT DOCUMENTS

| | | | |
|---|---|---|---|
| 3,406,800 | 10/1968 | Buchanan et al. | 192/30 W |
| 3,702,458 | 11/1972 | Capachietti et al. | 192/30 W |
| 3,946,845 | 3/1976 | Kamio | 192/30 W |
| 4,267,914 | 5/1981 | Saar | 192/147 |
| 4,440,279 | 4/1984 | Schreiner | 192/30 W |

Primary Examiner—George H. Krizmanich
Attorney, Agent, or Firm—Krass & Young

[57] ABSTRACT

An interlocking proximity switching device operated by the reciprocating member assembly of a hydraulic slave cylinder controlling the operation of the release mechanism of a motor vehicle mechanical clutch, the slave cylinder being hydraulically connected to a master cylinder having an input member operable by the motor vehicle clutch pedal. The switching device is adapted to close the motor vehicle starter relay circuit for a position of the slave cylinder output member, piston and/or push-rod, corresponding to full release of the clutch, such that the clutch must be fully released in order to allow starting the motor vehicle engine. Preferably, the switching device takes the form of a proximity transducer and of an appropriate circuitry for detecting full release of the clutch mechanism, irrespective of the amount of wear of the clutch.

10 Claims, 13 Drawing Figures

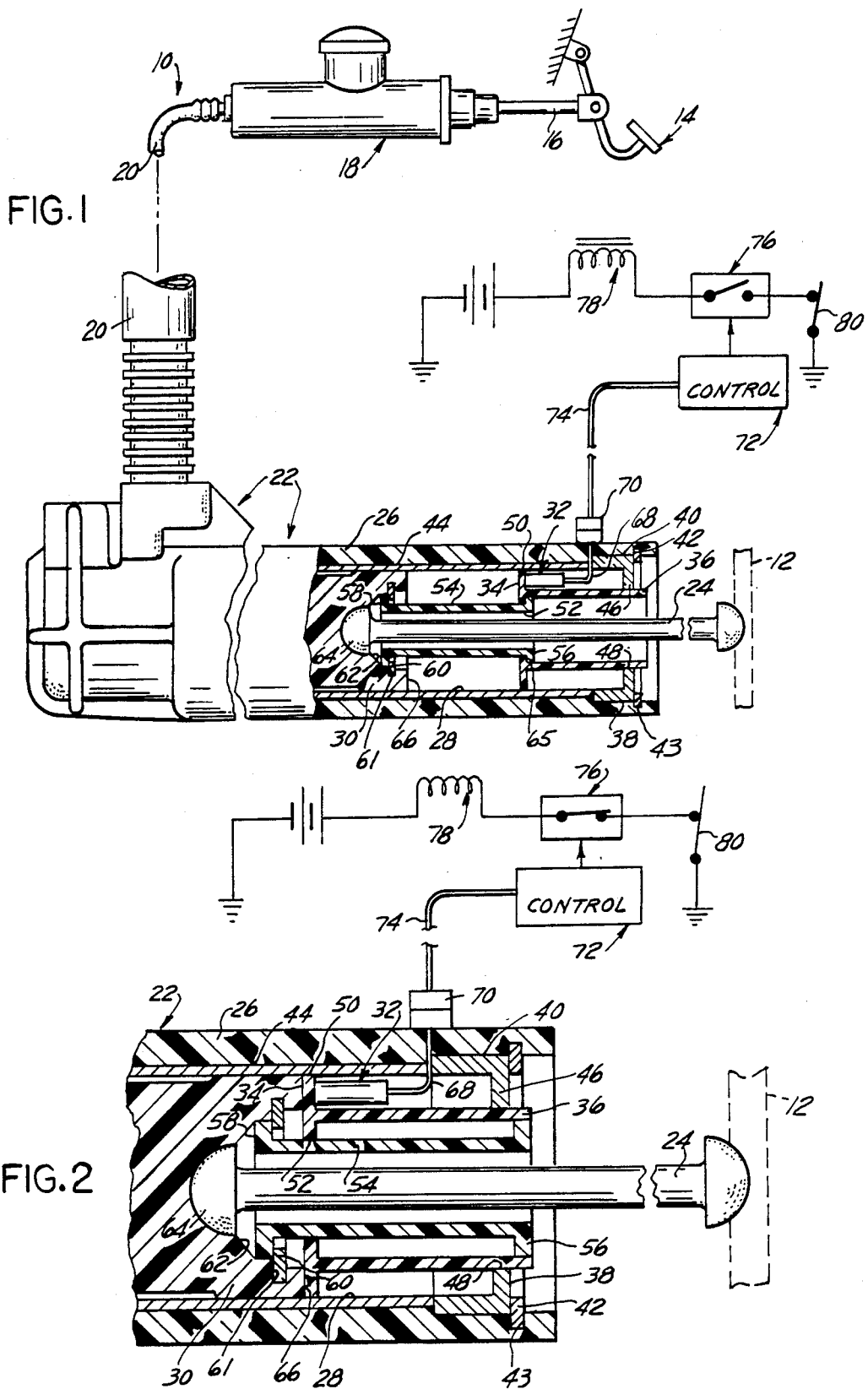

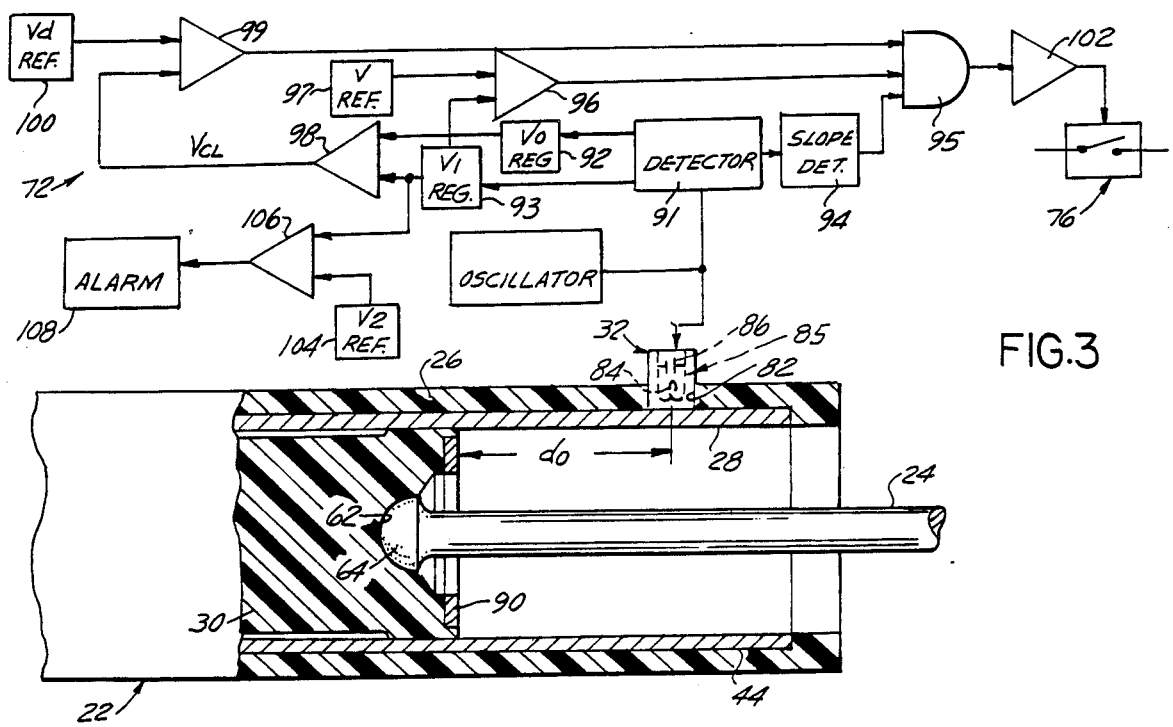
FIG.3
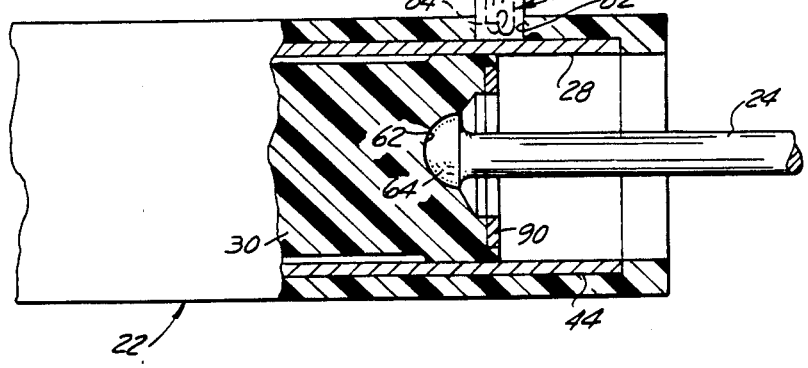
FIG.4

U.S. Patent  Nov. 10, 1987  Sheet 5 of 5  4,705,151
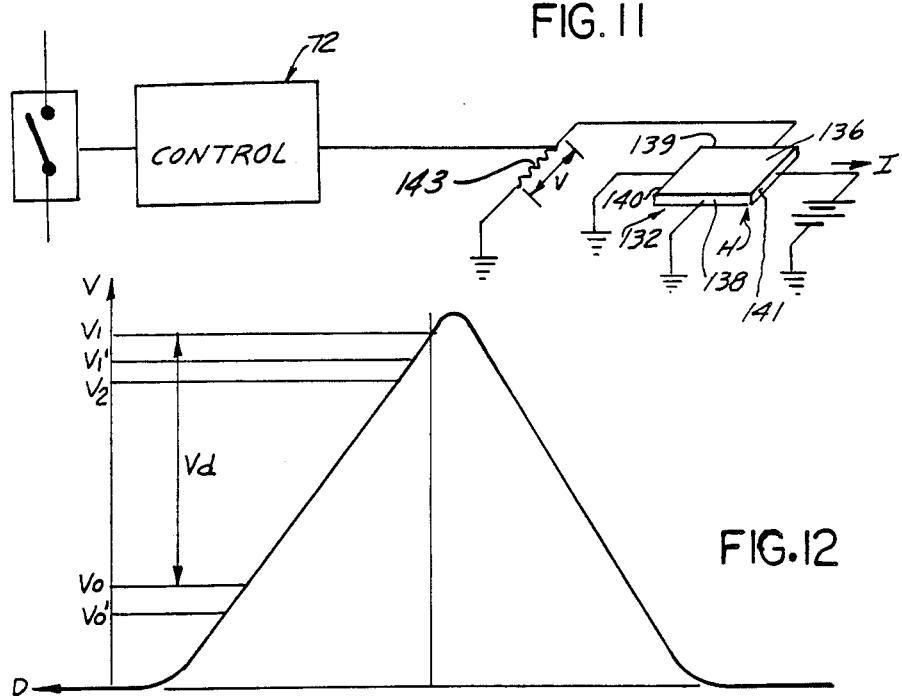
FIG. 11
FIG. 12
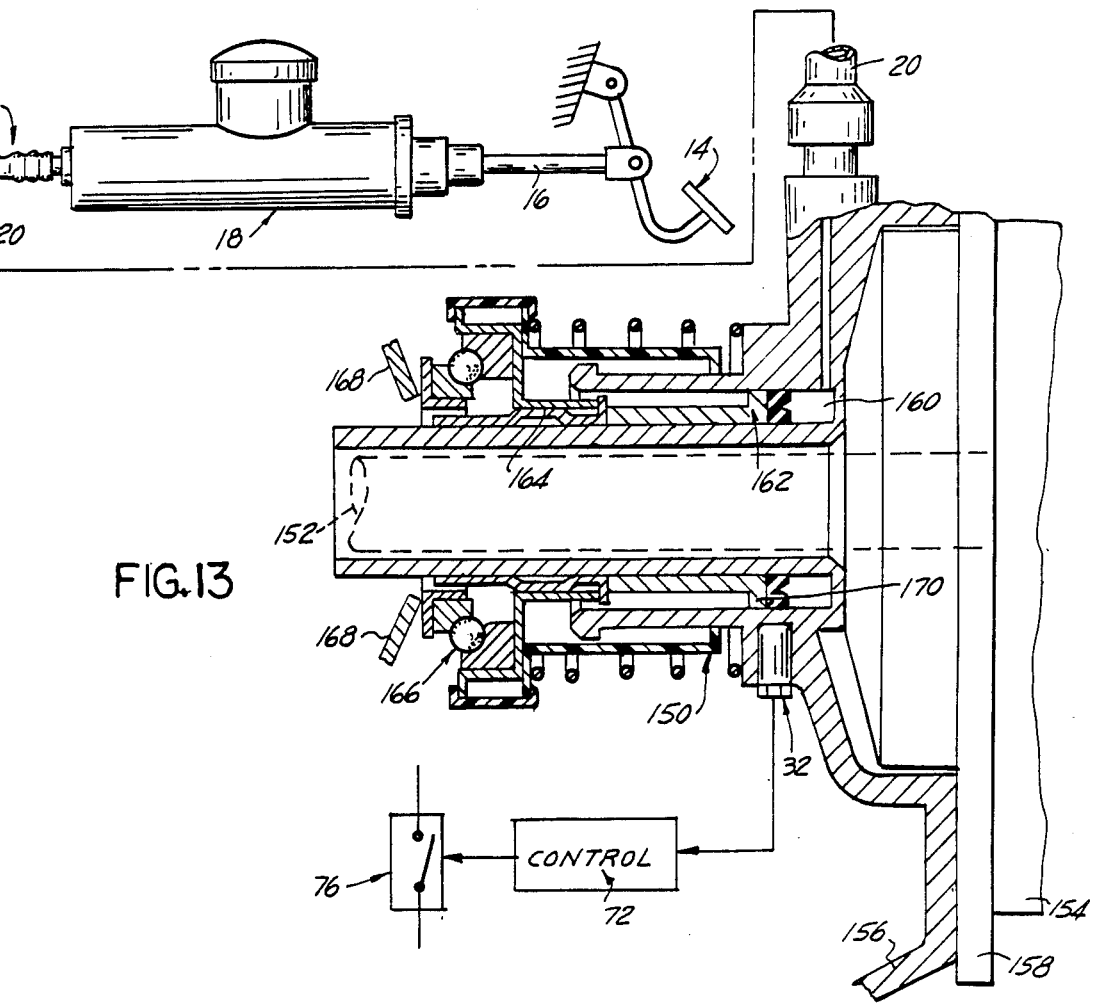
FIG. 13

HYDRAULIC SLAVE CYLINDER INTERLOCK SWITCHING DEVICE WITH PROXIMITY SENSOR

CROSS-REFERENCE TO RELATED APPLICATIONS

This application is related to U.S. Pat. Nos. 4,617,855 and 4,621,565 for Hydraulic Slave Cylinder Switch, and assigned to the same assignee as the present application.

BACKGROUND OF THE INVENTION

The present application relates to a proximity electrical switching device operated by the reciprocating output member, or piston push-rod assembly, of a hydraulic slave cylinder, such as the slave cylinder of a motor vehicle clutch hydraulic control system.

Hydraulic control apparatus for motor vehicle mechanical clutches are in wide use at the present for operating the clutch release mechanism of a motor vehicle provided with a mechanical clutch and a conventional manually shiftable transmission or gearbox. Examples of such hydraulic control systems for mechanical clutches are disclosed in U.S. Pat. Nos. 4,407,125 and 4,454,632, and in copending applications Ser. Nos. 371,958, 376,248, 477,161, 477,162, 477,159, 477,160, 537,869, 555,667, 555,666, 555,668, all assigned to the same assignee as the present application.

It has become general practice in the automobile industry to interlock the operation of a motor vehicle engine starter motor with other controls such that the starter motor is rendered inoperative unless the transmission is in neutral or park, in motor vehicles provided with an automatic transmission or, in motor vehicles provided with a foot operated clutch and a manually operated gear shift transmission, unless the transmission is in neutral and/or the clutch pedal is fully depressed.

In application Ser. No. 590,168, filed Mar. 16, 1984 for Hydraulic Master Cylinder Switch and assigned to the same assignee as the present application, master cylinder switches are disclosed that close an electrical circuit when the clutch pedal is fully depressed thus resulting in the master cylinder input member being fully retracted. Under normal operative conditions, fully depressing the clutch pedal results in transferring hydraulic fluid from the master cylinder to the slave cylinder operating the clutch release mechanism. Therefore, under normal operative conditions, full depression of the clutch pedal results in full release of the mechanical clutch, and such an arrangement, consisting in having the starter motor relay interlock circuit enabled as a result of the clutch pedal being fully depressed, has been found to be fully satisfactory unless the conduit interconnecting the master cylinder and the slave cylinder has been accidentally ruptured, or loss of hydraulic fluid has otherwise occurred, or the slave cylinder, for some other reasons, has become inoperative. Under such abnormal operative conditions, the clutch pedal may be fully depressed although the mechanical clutch could remain engaged.

Total loss of hydraulic fluid in a motor vehicle clutch control hydraulic apparatus may be detected by placing a level sensor in the hydraulic fluid reservoir associated with the master cylinder. Total or substantial loss of hydraulic fluid results in the level sensor providing a visual and/or audio indication to the driver or, in the alternative, the level sensor may be part of the starting motor relay circuit, functioning as an interlock switch. However, low hydraulic fluid level in the master cylinder reservoir does not necessarily indicate that the clutch hydraulic control apparatus is non-operative. Under conditions of low hydraulic fluid level in the reservoir, sufficient hydraulic fluid may be present in the system to maintain the apparatus in an operative condition.

It is therefore desirable to provide an interlock switch whose function is controlled by the clutch release slave cylinder, rather than by the master cylinder and which, for example, is actuated either directly by the hydraulic fluid pressure in the working chamber of the slave cylinder or by the reaction load upon the slave cylinder output member on actuation of the clutch from fully engaged to fully released, as disclosed in U.S. Pat. No. 4,621,565 assigned to the same assignee as the present application. Alternatively, the interlock switch may be such as to be closed as a result of a full stroke of the slave cylinder output member required for releasing the clutch which, in turn, requires that the switch be operated at a predetermined position of the output member corresponding to such full release of the mechanical clutch.

One advantage of hydraulic control apparatus for motor vehicle mechanical clutches is that the hydraulic control apparatus automatically compensate for progressive wear of the clutch friction linings. In a diaphragm spring disk clutch, for example, as the disk friction lining and the pressure rings wear the ends of the diaphragm fingers move outwardly, therefore pushing back the throw-out bearing. The wear is automatically compensated for as a result of the slave cylinder pushrod being progressively caused to retract further within the cylinder upon full engagement of the clutch under the action of the diaphragm spring force, thus causing in turn a progressive decrease of the volume of the working chamber of the slave cylinder, with the excess hydraulic fluid being progressively returned to the master cylinder and from the master cylinder to the hydraulic fluid reservoir. Therefore, a fixed position limit switch associated with the slave cylinder requires constant adjustment of the member causing closure of the switch upon full release of the clutch, in order to provide a foolproof arrangement.

Such switches forming part of the hydraulic slave cylinder actuatable by hydraulic fluid displacing an output member to a position fully releasing the clutch, and capable of automatically compensating for progressive change of such position in one direction as the clutch progressively wears, are disclosed in U.S. Pat. No. 4,617,855 assigned to the same assignee as the present application. Mechanical switches, however, rely for proper functioning on the engagement of two metallic contacts, one displaceable relative to the other. The contact surfaces may become oxidized or corroded, or they may become covered with dirt, or with a thin film of oil, thus preventing the establishment of a positive path for electricity from one contact to the other.

SUMMARY OF THE INVENTION

The present invention provides a contactless switching device incorporated in the structure of a hydraulic slave cylinder adapted to release a mechanical clutch such as a diaphragm disk clutch. The contactless switching device is adapted to close an interlock circuit, such as the starter relay circuit of a motor vehicle engine, only if the position of the output member of the slave cylinder indicates full release of the clutch.

By providing diverse switching devices of the proximity type, the present invention provides fail-safe interlock switching devices which do not rely for their operation on closure of an electrical circuit by physical engagement of contact surfaces which may tarnish, oxidize or corrode through use, or which may wear or become covered with dirt preventing an unbroken electrical path from being established. The switching devices of the invention comprise a proximity sensor or transducer which may be a capacitance, inductance or Hall effect sensor, for example.

The many objects and advantages of the present invention will become apparent to those skilled in the art when the following description of the best modes contemplated for practicing the invention are read in conjunction with the accompanying drawings, wherein like reference numerals relate to like or equivalent parts, and in which:

BRIEF DESCRIPTION OF THE DRAWING

FIG. 1 is a schematic illustration of a hydraulic apparatus for operating a clutch release mechanism showing, partly in section, a hydraulic slave cylinder having an output member coupled to the clutch release mechanism, and provided with an interlock proximity switching device according to the present invention;

FIG. 2 is a partial sectional view of the slave cylinder of FIG. 1 showing the relative position of the diverse components upon full release of the clutch;

FIG. 3 is a partial view of a slave cylinder similar to the slave cylinder of FIGS. 1-2, but showing a modification of the invention;

FIG. 4 is a view similar to FIG. 3, but showing the relative position of the diverse components upon full release of the clutch;

FIG. 11 is an electrical schematic of the apparatus of FIG. 10;

FIG. 12 is a diagram, useful in explaining the operation of the apparatus of FIG. 10; and FIG. 13 is a schematic illustration of a hydraulic apparatus having an annular slave cylinder disposed around a motor vehicle driveshaft between the clutch and the transmission housing of the motor vehicle and provided with an example of interlock proximity switching device according to the present invention.

DETAILED DESCRIPTION OF THE PREFERRED EMBODIMENTS

Figure 5:
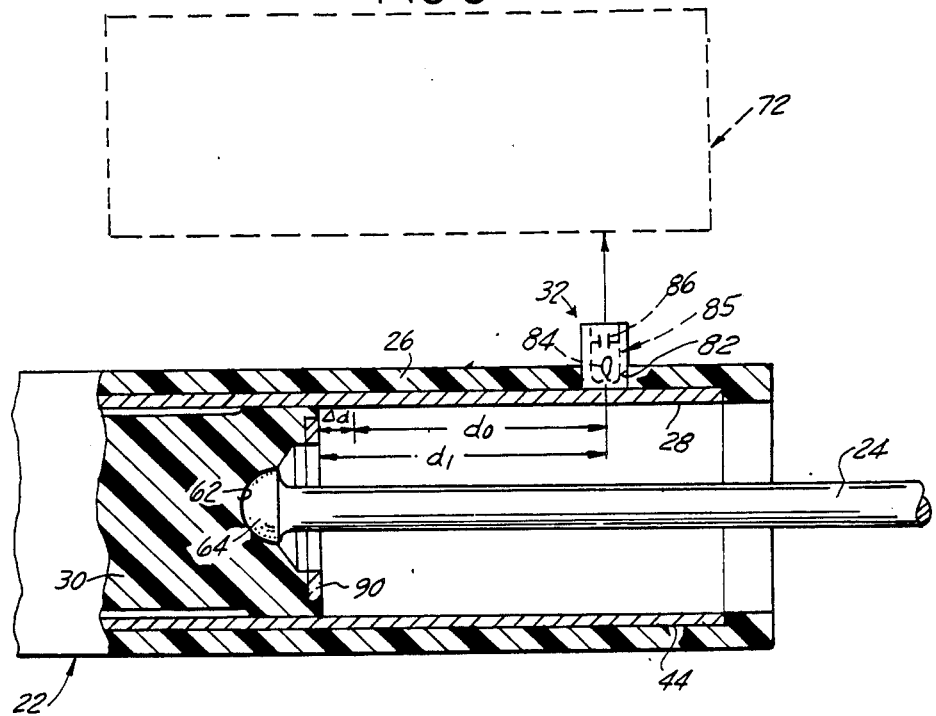
FIG. 5 is a view similar to FIG. 3 showing the relative position of the diverse components upon engagement of the clutch, after the clutch has been subjected to wear.
Figure 6:
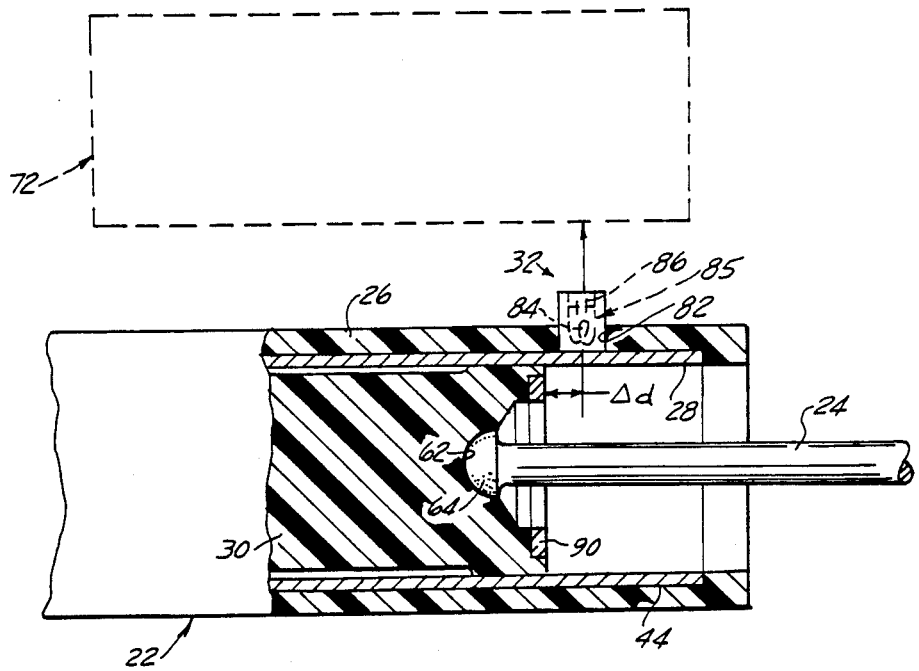
FIG. 6 is a view similar to FIG. 4, but showing the relative position of the diverse components upon full release of the clutch having been subjected to wear.

Referring to the drawing, and more particularly to FIG. 1, there is illustrated a hydraulic apparatus 10 for the remote operation of a clutch release mechanism 12 from a clutch control pedal 14 installed, in the usual position and manner, in the driver compartment of a motor vehicle, not shown. The clutch control pedal 14 is adapted to actuate the input rod 16 of a master cylinder 18 connected, via a conduit 20, to a slave cylinder 22. Inward displacement of the master cylinder input rod 16 causes a corresponding outward displacement of the slave cylinder output member, or pushrod, 24, the end of the pushrod 24 engaging the clutch release mechanism 12. The housing 26 of the slave cylinder 22 is provided with a mounting flange, or other mounting means, not shown, for affixing the slave cylinder 22 in an appropriate location through an opening in the clutch bell housing for example.

The slave cylinder housing 26 has a cylindrical bore 28 in which is reciprocably disposed a piston 30. When hydraulic fluid displaced from the master cylinder 18 is introduced, via the conduit 20, into the slave cylinder bore 28 on one side of the piston 30, the flow of hydraulic fluid into the slave cylinder 22 causes the piston 30, and consequently the output member or pushrod 24 displaced thereby, to travel from the position indicated at FIG. 1 to the position indicated at FIG. 2.

A proximity transducer or sensor, generally designated at 32 is mounted in the bore 28 of the slave cylinder 22 on the end flange 34 of a sleeve 36 disposed concentric to the bore 28 at the end of the cylinder housing 26 through which the output member of rod 24 projects. Normally, the open end of the cylinder bore 28 is protected by an appropriate elastomeric boot, not shown for the sake of clarity of the drawing, which prevents introduction of dirt into the cylinder housing.

The sleeve 36, made preferably of plastic material, is frictionally held by a cup-shaped retainer 38 having a peripheral cylindrical portion 40 press-fitted, or otherwise held such as, for example, by a split resilient retaining ring 42 disposed in a corresponding internal groove 43 proximate the end of the cylinder housing 26. In the structure illustrated, the cylinder housing 26 is made preferably of plastic and is provided internally with a metallic sleeve 44 defining the cylinder bore 28. The end of the cylindrical portion 40 of the cup-shaped retainer 38 abuts against the end of the metallic sleeve 44. The cup-shaped retainer 38 has an internally radially directed flange portion 46 ending in a circular opening 48 frictionally engaging the periphery of the sleeve 36. The flange 34 of the sleeve 36, on which is mounted the proximity transducer or sensor 32, has a peripheral circular edge 50 engaging the surface of the bore 28 of the slave cylinder 22 and an internal circular edge 52 peripherally supporting a second sleeve 54 having an exteriorly directed end abutment flange 56 in sliding engagement with the internal surface of the first sleeve 36. The other end of the sleeve 54 is also provided with an exteriorly directed flange 58 for attachment to the end of the piston 36 by means of a split retainer spring ring 60, for example, engaged in a corresponding groove 61 in the piston end cavity or recess 62 in which is engaged the enlarged spherical end 64 of the slave cylinder output member or rod 24.

The telescopic sleeve arrangement of FIGS. 1-2, for supporting the proximity transducer or sensor 32, provides automatic clutch wear compensation means. As the clutch wears, the clutch release member 12 which, in the structure of FIG. 1 is, as is well known in the art, the clutch release fork lever, tends to move to the left as seen in the drawing, thus tending to displace to the left the rod 24 and the piston 30. Because the second sleeve 54 is solidly attached to the piston 30, the abutting engagement 65 between the shoulder formed by the second sleeve flange 56 and the first sleeve flange 34 causes the first sleeve 36 supporting the proximity transducer or sensor 32 to be also progressively displaced to the left, with the result that, upon full release of the clutch, FIG. 2, the annular end face 66 of the piston 30 abuttingly engages the flange 34 of the sleeve 36, as shown at FIG. 2. Initial setting of the position of the sleeve 36 is automatically effected in the course of the first release of the clutch as a result of the annular end face 66 of the piston 30 engaging the sleeve flange 34 and displacing the sleeve 36 toward the right, as seen in the drawings.

The proximity transducer or sensor 32 is for example of the inductance type, as for instance a proximity sensor manufactured by Electro Corporation, of Sarasota, Fla. The "target" takes the form of the metallic ring 60 holding the sleeve 54 fastened to the piston 30, usually made of plastic, or, in the alternative, the piston 30 itself if metallic. The transducer or sensor 32, held with its tip bonded or otherwise fastened behind the sleeve flange 34, is connected through a flexible electrical cable 68 passed through the wall of the cylinder housing 26 and an appropriate electrical connector 70 to a control circuit 72 via a line 74. The control circuit 72, examples of which are described hereinafter, operates a normally open interlock relay switch 76 connected in series in the circuit of the starter relay 78 of the motor vehicle engine. In this manner, when the starter switch 80 is closed, the starter relay 78 is activated only if the interlock relay switch 76 is closed, and the arrangement of the control circuit 72 is such that the interlock switch 76 is closed only upon the proximity transducer or sensor 32 providing at the input of the control circuit 72 a signal indicating that the target is in its closest proximity to the transducer or sensor 32, as shown at FIG. 2, which is representative of full release of the clutch mechanism. As full release of the clutch mechanism always corresponds to the same peak of the signal provided by the transducer or sensor 32, in turn always corresponding to engagement of the annular face 66 of the piston 30 with the flange 34 of the sleeve 36, the control circuit 72 is greatly simplified and may consist of a comparator comparing a signal at the output of the transducer or sensor 32 with a reference signal, such as a reference voltage, for providing at the output of the comparator a signal only when the comparison indicates that the signal at the output of the transducer or sensor 32 is, for example, equal to the reference signal.

By using a proximity transducer or sensor, rather than using an electrical switch requiring physical engagement of contacts for providing an output signal, as disclosed in U.S. Pat. No. 4,617,855 the improvement of the present invention provides substantial simplification of the interlock switch mechanical portion, and permits to dispense with the mechanical clutch wear compensation structure disclosed in copending application and hereinbefore described.

FIGS. 3-6 illustrate such a mechanically simplified structure wherein the proximity transducer or sensor 32 is simply mounted through the wall of the housing 26 of the slave cylinder 22 at a location corresponding approximately to the end of maximum stroke of the piston 30. The slave cylinder housing 26 has a transverse radial blind aperture 82 through its wall in which the tip of the housing of the proximity transducer or sensor 32 is affixed, by bonding for example, or by providing a screw thread connection between the peripheral surface of the housing of the proximity transducer or sensor 32 and the internal surface of the mounting aperture 82. The tip of the proximity transducer or sensor 32 is thus disposed proximate to, or in engagement with, the peripheral surface of the sleeve 44.

Figure 7:
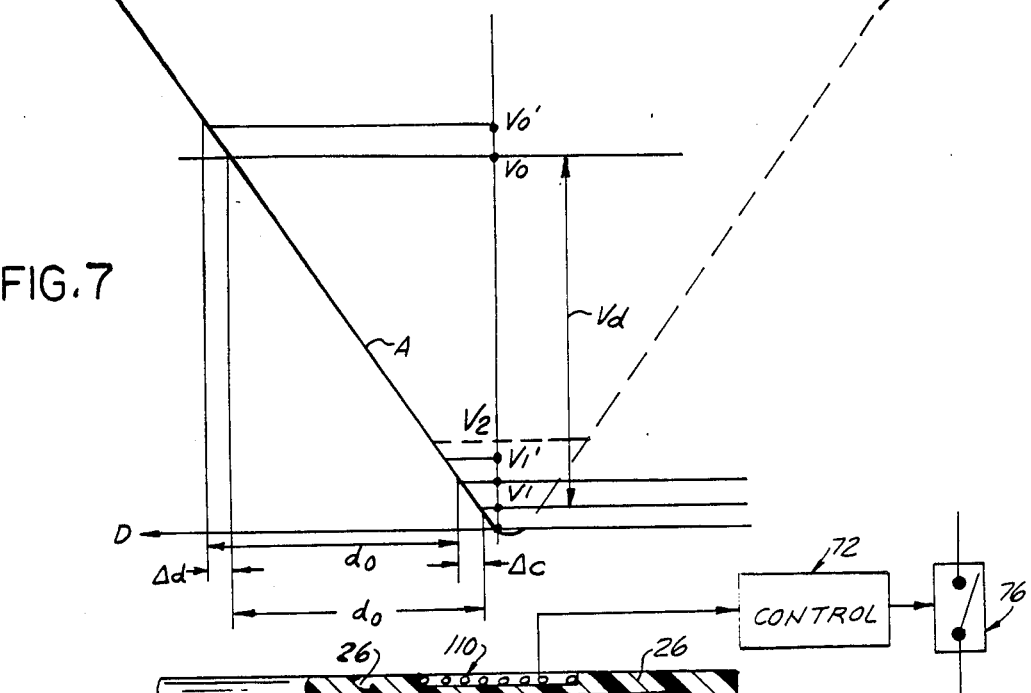
FIG. 7 is a diagram useful in explaining the operation of the apparatus of FIGS. 3-6.

The proximity transducer or sensor 32 is, in the example of structure illustrated, an inductance sensor having an inductance coil winding 84 connected in a resonant circuit 85 formed by the coil winding 84 and, for example, a parallel capacitor 86. An oscillator 88 applies a signal at an appropriate frequency to the resonant circuit 85 defined by the coil winding 84 and the parallel capacitor 86. The target may consist simply of a metallic ring 90 attached to the annular end face of the piston 30. As a result of the motion of the piston 30 from the home position shown at FIG. 3 to the clutch full release position shown at FIG. 4 the metallic ring target 90 acts as a variable load for the resonant circuit 85, through eddy current losses in the metallic ring target 90. Motion of the metallic ring target 90 towards the transducer or sensor 32 increases the power loss of the resonant circuit 85 such that the amplitude of the signal provided by the oscillator 88 progressively decreases, generally non-linearly, from a maximum to a minimum. A detector 91, having an input to which is applied the signal from the oscillator 88, provides at its output a voltage signal which is, for example, the envelope of the decaying oscillating signal as illustrated in the diagram of FIG. 7 by a curve A, which is a representation of the amplitude of the oscillation signal, detected by the detector envelope as a function of the distance of the target 90, FIG. 3, from the transducer or sensor 32, the envelope curve A having a substantially linear portion. When the target 90 is farthest removed from the coil winding 84 of the resonant circuit 85, which corresponds to a fully engaged clutch, the voltage detected by the detector 91 is the voltage Vo, FIG. 7. The voltage Vo is stored in a memory 92. Disengagement of the clutch results in the target 90 being displaced by the piston 30 toward the transducer or sensor 32 and, when it has travelled the distance do, the coil or winding 84 of the sensor resonant circuit 85 is subjected to maximum saturation and the envelope voltage drops to a value V1 which corresponds to full release of the clutch. Thereafter, the voltage V1 remains constant as long as the clutch pedal is depressed and the clutch is fully released. The voltage V1 is stored in a memory 93.

The detector 91, FIG. 3, has an output connected to a slope detector 94 which monitors the slope of the curve A of FIG. 7 and provides an output signal when the curve A reaches its horizontal portion corresponding to the envelope constant voltage V1. The output signal of the slope detector 94, when detecting the horizontal slope of the curve A, is applied to one of the inputs of an AND gate 95. The voltage V1, stored in the memory 93 is compared in a comparator 96 to a reference voltage obtained from a voltage reference 97. The voltage reference 97 is adjusted such as to supply a reference voltage substantially equal to the voltage V1. A long as the reference voltage applied to an input of the comparator 96 is equal or higher than the voltage V1, a signal appears at the output of the comparator 96 which is applied to another input of the AND gate 95.

In the diagram of FIG. 7, the difference between the voltage Vo representative of a fully engaged clutch and the constant voltage V1 representative of the fully released clutch is the voltage differential Vd. The voltage level Vo stored in the memory 92 is compared in a comparator 98, FIG. 3, with the voltage level V1 stored in the memory 93. The comparator 98 is set such that it provides at its output a signal Vd which is the difference between the voltage value Vo and the voltage value V1. The voltage Vd at the output of the comparator 98 is compared in a comparator 99 with a reference voltage provided by the voltage reference source 100, and the comparator 99 provides a signal at its output when the comparison indicates that the voltage differential Vd is substantially equal to the reference voltage. The signal appearing at the output of the comparator 99 is applied to a third input of the AND gate 95. Consequently a signal appears at the output of the AND gate 95 only when the slope of the curve A of FIG. 7 is horizontal, the constant voltage V1 is equal to or higher than the V1 reference voltage and the voltage drop Vd is equal to the Vd reference voltage, which are the three conditions present when the piston 30 has reached the end of its stroke causing full release of the clutch. After amplification through a power amplifier 102, the signal appearing at the output of the AND gate 95 is applied to the interlock switch relay 76, thus enabling the motor vehicle engine to be started.

Monitoring the voltage drop Vd from Vo to V1 ensures that the slave cylinder piston 30 has fully travelled the distance do from its home position corresponding to full engagement of the clutch, FIG. 3, to the position of full clutch release, FIG. 4, such as to eliminate errors that could result from the motor vehicle operator having partially depressed the clutch pedal causing partial displacement of the slave cylinder piston 30 to a corresponding position intermediary between its home position of full engagement of the clutch to its position of full disengagement of the clutch, and holding the clutch pedal in that partially depressed position which will cause the curve A, FIG. 7, to establish itself along a horizontal slope, thus providing a signal at the output of the slope detector 94 to the corresponding input of the AND gate 95. Under such conditions a signal would also be provided at the output of the comparator 96, and applied to an input of the AND gate 95, because the comparator 96 provides an output signal as long as the voltage value V1 is greater than the reference voltage provided by the reference voltage source 97. However, because no output signal would appear at the output of the comparator 99 in view of the voltage differential Vd at the output of the comparator 98 being smaller than the Vd reference voltage provided by the Vd voltage reference 100, no signal would appear at the output of the comparator 99, thus inhibiting the AND gate 95, with the result that the interlock relay switch 76 remains open, and the motor vehicle engine cannot be started.

As the clutch wears, the piston 30 is returned progressively further away from the proximity transducer or sensor 32 at the end of its stroke corresponding to the position of full engagement of the clutch, FIG. 5, to a distance arbitrarily designated dl which is longer than do by an increment Δd. In the fully released position of the clutch, FIG. 6, the target 90 has been displaced from the fully engaged clutch position by the distance do and is separated from its original position relative to the transducer or sensor 32 by that same distance Δd corresponding to the amount of wear of the clutch. When the target 90 carried by the piston 30 is at its home position of full engagement of the clutch, the coil or winding 84 of the transducer or sensor 32 is least saturated and the envelope voltage detected by the detector 91 is Vo', FIG. 7, which is stored in the memory 92. When the target 90 is in its most proximate position with the coil or winding 84 of the transducer or sensor 32, FIG. 6, the coil 84 is less saturated than when the clutch was new and the target 90 was located closer to the transducer or sensor 32. The constant voltage V1' appearing at the output of the detector 91 is stored in the memory 93. The voltage V1' in the memory 93 is compared in the comparator 96 with the reference voltage provided with the reference voltage source, and as V1' is higher than the reference voltage, a signal appears at the output of the comparator 99, which is applied to the appropriate input of the AND gate 95. The slope detector 94, having detected the constant envelope voltage V1' of the horizontal portion of the curve A corresponding to full release of the clutch, provides a signal at its output which is applied to the corresponding input of the AND gate 95. As the voltage differential Vd remains the same, because the distance do remains the same whether the clutch is new or worn, a signal appears at the output of the comparator 99, which is applied to the corresponding input of the AND gate 95. Consequently a signal appears at the output of the AND gate 95, which, after amplification through the power amplifier 102, actuates the interlock relay switch 76. The arrangement of FIG. 3 therefore provides correct functioning of the interlock switch relay 76, irrespective of the amount of wear of the clutch, and requires only an initial setting of the reference voltage provided by the voltage reference supply 97.

The arrangement of FIG. 3 also provides, if so desired, a indicator of the clutch wear, by means of a second voltage reference supply 104 which is established, for example, at a voltage V2 of the curve A. The voltage value stored in the memory 93 is compared to the voltage reference V2 in a comparator 106. The comparator 106 provides at its output a signal as soon as the voltage value stored in the memory 93 is equal to or higher than the reference voltage V2 for sounding an alarm 108 such as for example a buzzer, or an annunciator light on the motor vehicle instrument panel, or both.

It will be appreciated by those skilled in the art that the slope detector 94 may be replaced by a delay circuit that provides at its output a signal only if the constant voltage due to the horizontal portion of the curve A of FIG. 7 is detected by the detector 91 for a predetermined period of time. It will be further appreciated that the control circuit 72 may be made part of or incorporated in the motor vehicle on board microprocessor, and that a purely digital control circuit may be used.

Figure 8:
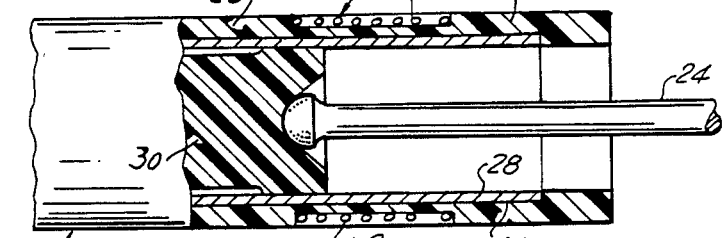
FIGS. 8-10 are partial sectional views of a hydraulic slave cylinder provided with further modifications of the invention.

As an alternative to using a proximity transducer or sensor in the form of an inductive probe, an inductive sensor may be built-in directly in the housing 26 of the slave cylinder 22, as illustrated at FIG. 8. The proximity inductive sensor takes the form of an electrical winding 110 for example disposed in an annular recess 112 on the periphery of the cylinder housing 26, preferably embedded in an appropriate bonding material such as an epoxy or the like. The winding 110 represents the coil of a series capacitance or parallel capacitance resonant circuit whose function is substantially the same as the function of the proximity inductive transducer or sensor 32 previously described. The inductance of the winding 112 varies as a function of the displacement along its axis of the metallic output member or rod 24 of the slave cylinder 22. Alternatively, the piston 30 may be made of metal, such as aluminum for example, or it may be provided with a metallic portion to increase the sensitivity of the sensor.

Proximity transducers or sensors of the inductance type are not the only kind of transducer or sensor that are contemplated by the present invention. Any proximity transducer or sensor such as a capacitance or a Hall-effect sensor may be used.

Figure 9:
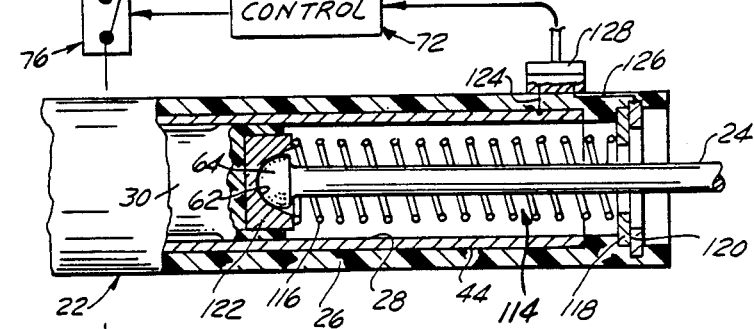

At FIG. 9, there is schematically illustrated an arrangement for a capacitive sensor generally designated at 114. One plate of the capacitive sensor 114 takes the form of the metallic sleeve 44. The other plate of the capacitive sensor 114 comprises the slave cylinder output rod 24 in combination with a coil spring 116 having an end engaged with, or preferably welded, soldered or brazed to, a metallic ring 118 installed proximate the end of the housing 26 and held by a retainer metallic split resilient ring 120. The other end of the coil spring 116 is attached and electrically connected to a metallic plug 22 inserted in the end face of the piston 30 and provided with the spherical recess 62 engaged by the enlarged spherical head 64 of the rod 24. The second plate of the capacitor is thus formed by both the coil spring 116 and the rod 24, and reciprocation of the piston 30 causes variation of the capacitance of the capacitance sensor 114. The plate formed by the metallic sleeve 44 and the plate formed by the assembly of the rod 24 and the coil spring 116 are placed across an appropriate control circuit 72 by means of electrical connections 124 and 126 through an electrical connector 128. As is well known in the art, the capacitance of the capacitance sensor 114 may be measured in the control circuit 72 by means of a Wheatstone bridge, and for a minimum value of the capacitance corresponding to full extension of the piston 30 for full release of the clutch, the control circuit 72 is adapted to close the interlock relay 76. The remaining of the control circuit 72 may be identical or similar to the control circuit 72 of FIGS. 3-6, thus providing voltage signals proportional to, or inversely proportional to, the capacitance of the capacitance sensor 114, which are compared with reference voltages, the horizontal slope of the voltage signal curve being detected to determine full release of the clutch.

Figure 10:
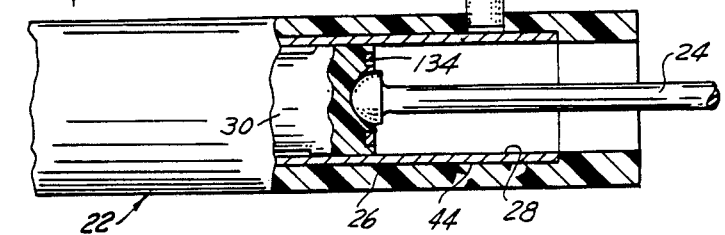

Effective sensors that may be used as proximity detectors are Hall-effect solid state sensors made of a thin plate of material such as indium arsenide or a doped silicon chip. An example of application including a Hall-effect probe 132, substituted for the inductance probe 32 of FIGS. 3-6, is illustrated at FIG. 10, the piston 30 of the slave cylinder 22 having a permanent magnet insert, for example in the form of a magnet annular member or ring 134. When the slave cylinder piston 30 is displaced to the right, as seen in FIG. 10, for displacing the slave cylinder output rod 24 to a position corresponding to full release of the clutch, the component of the magnetic field H, FIG. 11, produced by the magnet ring 134 and applied to the plane of the Hall-effect plate 136 increases in strength, therefore increasing the voltage between the faces 138 and 139 of the plate, a constant current I supplied by a D.C. voltage source 140 flowing from the faces 141 and 142 of the Hall-effect plate 136. The control circuit 72 provides at its output a signal that, in turn, controls the interlock relay 76 when the voltage across the opposite faces 138 and 139 of the Hall-effect plate reaches a maximum value.

As schematically illustrated at FIG. 11, the voltage across the opposite faces 138 and 139 of the Hall-effect plate 132 causes a current flow through a load resistor 143. A variable voltage signal V, proportional to the voltage across the faces 138 and 139 of the Hall-effect plate 136 appears across the resistor 143. From the voltage signal V varying as a function of the distance between the piston magnet ring 134, FIG. 10, and the Hall-effect transducer, the diverse voltage values V1, Vo, V1', Vo' and constant voltage differential Vd, FIG. 12, are derived which are applied directly to the control circuit 72, the detector 91 of the control circuit 72 of FIG. 3 being omitted as unnecessary.

Although the invention has been described in applications to cylindrical hydraulic slave cylinders, it will be readily apparent that inductive, capacitance, or Hall-effect transducers or sensors may be used in clutch hydraulic control apparatus wherein the slave cylinder is in the form of an annular slave cylinder such as shown at 150 at FIG. 13. As is well known, the annular slave cylinder 150 is installed around the driveshaft 152 between the clutch plate and the transmission housing 154 of a motor vehicle and, in the structure illustrated, forms part of the clutch bell housing 156 bolted against the transmission end plate 158. Depressing the clutch pedal 14 causes transfer of hydraulic fluid from the master cylinder 18, through the conduit 20, to the annular chamber 160 in the slave cylinder 15, and thus displaces the annular piston 162 reciprocably disposed within the cylinder 150. The annular piston 162 is provided with a bearing carrier 164 supporting the clutch throw-out ball bearing 166 having a race, for example the inner race, engaged with the clutch diaphragm release fingers 168.

A proximity transducer or sensor 32 is affixed in an appropriate transverse cavity in the end flange of the annular cylinder 150. The proximity transducer or sensor 32 is adapted to sense the displacement and position of a target which may consist of the annular enlarged end portion 170 of the piston 162. Preferably, the annular cylinder 150, which in the structure illustrated is made integral with the clutch bell housing 156, is a metallic casting such as aluminum alloy and, for the purpose of increasing the sensitivity of the sensor 32, a different metallic insert acting as a target may be used in combination with a transducer or sensor of the inductance type. With a transducer or sensor 32 of the Hall-effect type, the piston head 170 may be made of permanent magnet material or provided with a ring magnet. A variable capacitance sensor may also be built in in the annular cylinder 150 by, for example, making the piston 162 of dielectric material with an appropriate metallic sleeve out of contact from the cylinder walls, the cylinder walls defining one plate of the variable capacitor and the sleeve installed on the piston body forming the other plate.

Having thus described the present invention by way of examples of structure thereof well designed for accomplishing the objects of the invention, modification whereof will be apparent to those skilled in the art, what is claimed as new is as follows:

1. In a hydraulic apparatus for remotely actuating a motor vehicle mechanical clutch, said apparatus comprising a master cylinder having an input member operable by a clutch control pedal, a slave cylinder having a piston associated with an output member operating a release mechanism for the clutch to disengage the clutch, and a conduit connecting said master cylinder to said slave cylinder, the improvement comprising a proximity sensor mounted on said slave cylinder in proximity to the path of movement of said output member and operative to provide an output signal representing a position of said output member corresponding to disengagement of the clutch, means deriving from said sensor output signal an appropriate control signal corresponding to disengagement of the clutch, an electrical starter motor circuit for the engine of the motor vehicle and including interlock switching means, and control means operable by said control signal for operating said interlock switching means to enable said starter motor circuit.

2. The improvement of claim 1 wherein said proximity sensor is an inductive transducer.

3. The improvement of claim 1 wherein said proximity sensor is a capacitive transducer.

4. The improvement of claim 1 wherein said proximity sensor is a Hall-effect transducer.

5. The improvement of claim 1 further comprising clutch wear compensation means associated with said proximity sensor and sensitive to the position of said output member corresponding to engagement of the clutch, for producing said control signal irrespective of wear of the clutch.

6. The improvement of claim 5 wherein said clutch wear compensation means comprise a longitudinally displaceable adjustable support member for said proximity sensor, first abutment means associated with said output member for setting said adjustable support member in a reference position corresponding to full disengagement of said clutch, means holding said support member in said reference position, and second abutment means associated with said output member for gradually displacing said support member to a different reference position as a function of clutch wear.

7. The improvement of claim 6 wherein said adjustable support member is a first sleeve disposed at an end of said slave cylinder surrounding said output member, said proximity sensor is mounted on said first sleeve, said first abutment means is said piston, and said second abutment means is a second sleeve disposed coaxially in said first sleeve and displaced in unison with said piston, said second sleeve having an abutment engageable with said first sleeve upon full engagement of said clutch for resetting said first sleeve by an increment of displacement corresponding to said clutch wear.

8. The improvement of claim 5 wherein said clutch wear compensation means comprises electrical circuit means connected to said proximity sensor, said circuit means comprising means for producing a first signal at the output of said proximity sensor varying as a function of the distance separating said proximity sensor from a target associated with said output member and displaceable therewith, means for developing a second signal upon said first signal reaching a constant value, means comparing said second signal to a threshold reference value, and means developing a third signal for producing said control signal upon said constant signal being at least equal said threshold reference value.

9. The improvement of claim 8 further comprising means storing a fourth signal proportional to a maximum of distance between said proximity sensor and said target, means comparing said fourth signal with said first signal, and means inhibiting said control signal unless said first and fourth signals are substantially equal.

10. The improvement of claim 9 further comprising means storing a reference value corresponding to maximum permissible wear of the clutch, means developing a fifth signal representing the position of said output member upon full engagement of said clutch and means comparing said reference value to said fifth signal for providing an alarm upon said fifth signal being substantially equal to said reference value.

* * * * *